(12) United States Patent
Massenbauer-Strafe et al.

(10) Patent No.: US 7,645,323 B2
(45) Date of Patent: Jan. 12, 2010

(54) METHOD AND APPARATUS FOR IMPROVING THE AIR QUALITY WITHIN AN ENCLOSED SPACE

(75) Inventors: Ilse A. Massenbauer-Strafe, Hong Kong (CN); Brian M. C. Neirynck, Hong Kong (CN); Jürgen F. G. Strafe, Hong Kong (CN)

(73) Assignee: Oxyvital Limited, Central (HK)

( * ) Notice: Subject to any disclaimer, the term of this patent is extended or adjusted under 35 U.S.C. 154(b) by 494 days.

(21) Appl. No.: 11/204,389

(22) Filed: Aug. 16, 2005

(65) Prior Publication Data

US 2007/0039465 A1     Feb. 22, 2007

(51) Int. Cl.
B01D 59/26     (2006.01)

(52) U.S. Cl. .................. 95/90; 96/131; 422/4; 422/122; 422/130; 423/230; 423/239.2

(58) Field of Classification Search .......... 502/6, 502/8; 422/122, 124, 222, 4, 130; 423/239.2, 423/230; 95/90, 96; 96/108, 131
See application file for complete search history.

(56) References Cited

U.S. PATENT DOCUMENTS

| | | | | |
|---|---|---|---|---|
| 1,593,137 | A | * | 7/1926 | O'Rourke et al. ............. 96/131 |
| 2,217,204 | A | * | 10/1940 | Jalma ............................. 62/78 |
| 3,297,400 | A | * | 1/1967 | Eastwood ................. 423/213.2 |
| 3,661,753 | A | * | 5/1972 | Aylaward et al. ............ 204/212 |
| 4,326,858 | A | * | 4/1982 | Benkmann ..................... 95/98 |
| 4,382,913 | A | * | 5/1983 | Chmiel et al. ................ 423/230 |
| 4,656,148 | A | * | 4/1987 | Buhler et al. .................. 502/34 |
| 5,096,469 | A | * | 3/1992 | Keefer ............................. 95/92 |
| 5,186,903 | A | * | 2/1993 | Cornwell ..................... 422/122 |
| 5,226,933 | A | * | 7/1993 | Knaebel et al. ................. 95/96 |
| 5,322,701 | A | * | 6/1994 | Cullen et al. ................. 426/124 |
| 5,762,686 | A | * | 6/1998 | Borzio ............................ 95/82 |
| 2001/0023640 | A1 | * | 9/2001 | Keefer et al. .................... 95/96 |

FOREIGN PATENT DOCUMENTS

WO       WO02/12796       2/2002

OTHER PUBLICATIONS

Lindeburg, Michael R. (2004). Chemical Engineering Reference Manual for the PE Exam . 6th Ed. (pp. 47-4 and 47-5). Professional Publications, Inc.*
Okachi et al. (Formaldehyde Encapsulated in Zeolite: A Long-Lived, Highly Activated One-Carbon Electrophile to Carbonyl-Ene Reactions) J. Am. Chem. Soc. 2004, 126, 2306-2307.*

* cited by examiner

*Primary Examiner*—Jason M Greene
*Assistant Examiner*—Anthony Shumate
(74) *Attorney, Agent, or Firm*—Jacobson Holman PLLC

(57) ABSTRACT

A method and apparatus for improving air quality within an enclosed space. The apparatus provides at least three molecular sieves that contain zeolite material to treat the air to remove toxins such as suspended particles, carbon dioxide, carbon monoxide, nitrogen dioxide, bacteria, formaldehyde, total volatile organic compounds, radon, ozone, toxic mould and organic odor-causing compounds. The apparatus uses the sieves such that one of the sieves is locked and retaining air, substantially immobile within, for a period of not less than 2 seconds to allow the zeolite material to breakdown the compounds and release the individual natural elements.

27 Claims, 1 Drawing Sheet

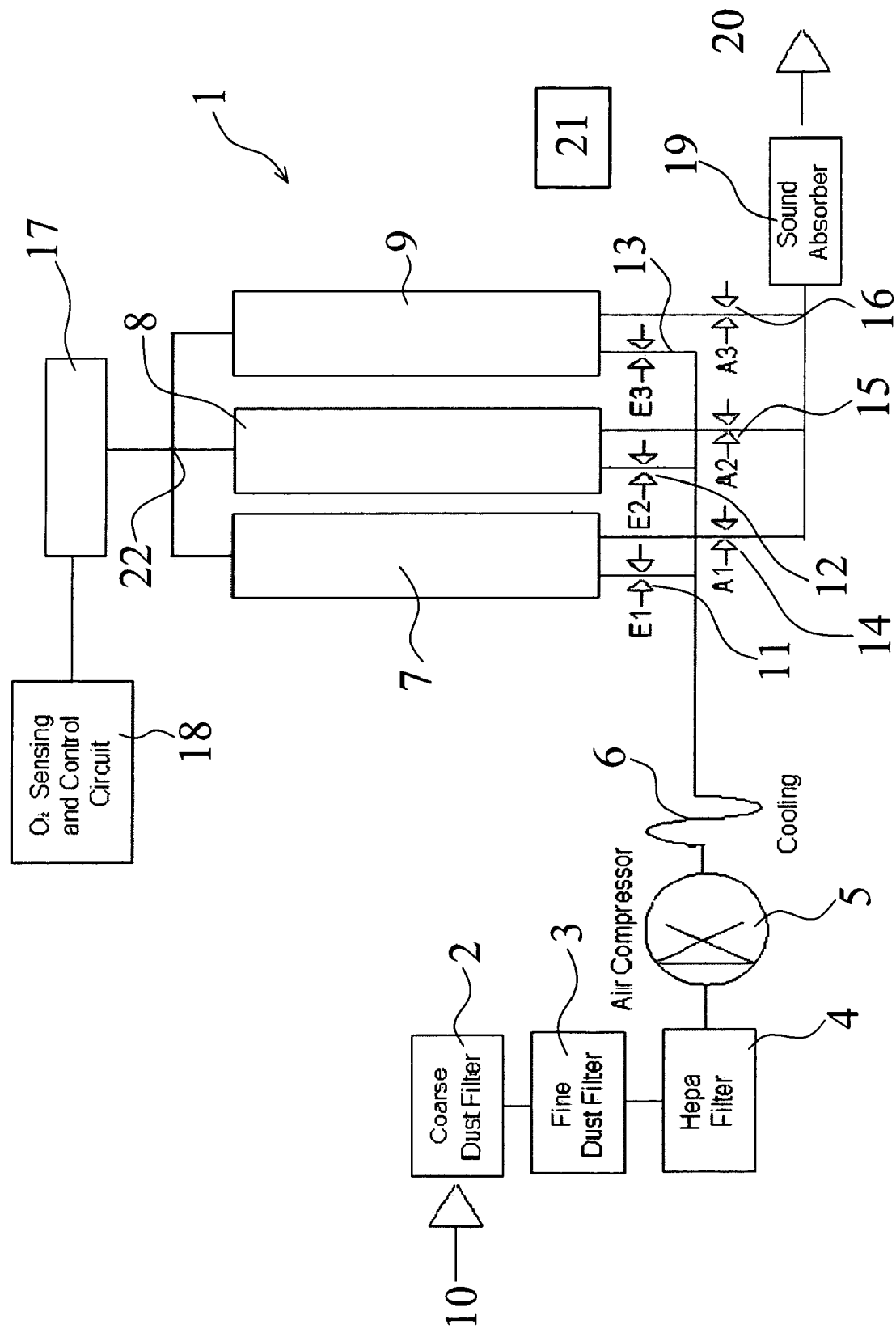

METHOD AND APPARATUS FOR IMPROVING THE AIR QUALITY WITHIN AN ENCLOSED SPACE

FIELD OF THE INVENTION

This invention relates to a method and apparatus for improving the air quality within an enclosed space and, in particular, although not necessarily solely, a stand-alone device for improving air quality in a domicile such as a home, apartment or similar. However, the invention may also apply to a vehicle such as an aeroplane, train, bus, car, etc.

BACKGROUND TO THE INVENTION

In most urban environments, there is a decreasing quality of air available in the general atmosphere. This reduction in air quality is repeated within buildings and, in some instances, can even be worse. Smoking within an enclosed building is harmful not only in respect of passive smoking but also due to the reduction in oxygen content and general impurities provided into the air aside from nicotine or tar.

The decrease in air quality is not only due to a decrease in oxygen content but also a corresponding increase in a number of potentially harmful constituents or pollutants. These include an increase in suspended particles, carbon dioxide, carbon monoxide, nitrogen dioxide, bacteria, formaldehyde, total volatile organic compounds (TVOCs), ozone, radon, toxic moulds, ammonia, sulphur dioxide and organic odour causing compounds.

Traditional forms of manipulating the atmosphere within a room utilize air conditioning for temperature control and, either integrally or separately, air filtration units that seek to remove larger particulate material. Although the air conditioning units may be provided with some filtration, these filters are generally an after-thought merely to preclude coarse particles from going through the air conditioning system. Regardless, these filters are generally static filters in each of the air inlets or outlets throughout the building and quickly become clogged with particulate matter. This requires regular maintenance to clean and replace the filters. Failure to do so can quickly turn the filters into a breeding ground for harmful organisms rather than any attempt to improve air quality.

For domestic appliances, separate air filtration units utilizing HEPA filters are also known. However, these merely seek to filter particulate materials and do not improve or alter the composition of the air passing through the filter.

Other apparatus seeks to improve air quality only in a controlled and highly localized environment through such apparatus as oxygen ventilators. Such ventilators are provided with face masks or similar to improve the air quality to a single user. However, such ventilators are not generally suitable or adapted for use in a larger environment such as an apartment or similar.

One solution towards the improvement of indoor air quality has been already been described in International Publication No. WO 02/12796. This apparatus is generally directed to the treatment of air within an entire building although does apply in principle to single room environments also. However, in the case of domestic appliances in particular, matters of cost are of paramount importance perhaps requiring some simplification of the apparatus. Furthermore, it is important to reduce the maintenance and service requirements of the apparatus as much as possible to bring these within the scope and capabilities of a typical home user rather than an experienced service technician.

OBJECT OF THE INVENTION

It is an object of the present invention to provide a method and apparatus for improving the air quality within an enclosed space that overcomes some of the disadvantages of the prior art by providing a simplified apparatus having simplified maintenance requirements suitable for a domestic appliance. It is at least an object of the present invention to provide the public with a useful choice.

SUMMARY OF THE INVENTION

Accordingly, in the first aspect, the invention may broadly be said to consist in a method of improving the air quality within an enclosed space comprising the steps of:
  drawing air from within said enclosed space;
  passing said drawn air through at least a first filter to remove at least some particulates;
  directing filtered air to a first molecular sieve containing zeolite material while directing air previously within said first molecular sieve to a second molecular sieve, directing air previously within said second molecular sieve to an outlet and simultaneously retaining air immobile within a third molecular sieve for a period of time not less than 2 seconds;
  subsequent to said retention period of not less than 2 seconds for said third sieve, directing filtered air to said second molecular sieve while passing air previously within said second sieve to said third sieve, passing air previously within said third sieve to said outlet and retaining air within said first sieve for a period of not less than 2 seconds;
  subsequent to said retention period of not less than 2 seconds for said first sieve, directing filtered air to said third molecular sieve while passing air previously within said third sieve to said first sieve, passing air previously within said first sieve to said outlet and retaining air within said second sieve for a period of not less than 2 seconds;
  such that said apparatus may provide a substantially continuous operation including a retention period for the air within each sieve.

Preferably said method includes a retention period of between 2 and 10 seconds.

More preferably said method includes a retention period of between 3 and 5 seconds.

Most preferably said method includes a retention period of between 3.5 and 4.5 seconds.

Accordingly, in a second aspect, the invention may broadly be said to consist in an apparatus for improving the air quality within an enclosed space comprising:
  air driving means to draw air from within said enclosed space through an air inlet;
  at least a first filter connected to said inlet to remove at least some particulates;
  at least three molecular sieves containing zeolite material connected in parallel to each other between said first filter and an outlet;
  a plurality of valves to direct flow from said first filter to any one of said three sieves, from said sieves to said outlet and between said sieves; and
  control means to control said plurality of valves such that air from said first filter may be directed to a first sieve, air from within said first sieve may be directed to a second sieve, air from within said second sieve may be directed to said outlet and air within a third sieve may be simultaneously retained for a period of not less than 2 seconds and subsequently controlling said valves such that each sieve progresses through the stages of receiving air from said first filter, retaining said air for a period of not less than 2 seconds and then receiving air from another sieve while being connected to an outlet.

Preferably said control means ensures a retention period of between 2 and 10 seconds.

More preferably said control means ensures a retention period of between 3 and 5 seconds.

Most preferably said control means ensures a retention period of between 3.5 and 4.5 seconds.

Preferably said apparatus comprises a free standing unit.

Alternatively said apparatus is incorporated into an alternative air moving or conditioning apparatus.

Preferably said molecular sieves are operated under a pressure greater than atmospheric.

Preferably said apparatus further includes a sensing means to sense performance of said first filter and an indicating means to alert a user to degradation of the performance beyond a pre-determined limit.

Further aspects of this invention may become apparent to those skilled in the art upon reading the following description.

BRIEF DESCRIPTION OF THE DRAWINGS

Preferred embodiments of the invention will now be described with reference to the following drawing in which:

FIG. 1 shows a schematic diagram of an apparatus forming part of a preferred embodiment of the invention.

DETAILED DESCRIPTION OF PREFERRED EMBODIMENTS

The invention relates to a method and apparatus for improving the air quality within an enclosed space including transport vehicles such as planes, trains, etc. Referring to the drawing, a first embodiment of an apparatus to improve air quality is shown. This diagram shows a portion of the apparatus that may be incorporated to act within an air circulation system in a building or provided as a freestanding unit in a single room or any other controlled environment. Although the preferred embodiment may be described in terms of a stand alone domestic appliance, the apparatus may also be included in existing air handling, moving or conditioning apparatus. For example, such apparatus may be incorporated into or connected with an air conditioning unit intended for specific control of air temperature.

In the endeavour to provide better treatment or conversion of the air within an enclosed space, the present invention looks towards the use of zeolites as attenuators for the air. Such an apparatus is disclosed in International Publication WO 02/12796, the disclosure of which is incorporated herein by reference.

The apparatus as shown in FIG. 1 is intended as a domestic appliance although it will be appreciated that it may also be used for larger units installed in air conditioning if desired. As such, the simplicity of the device and ease of maintenance are of considerable importance.

Referring to FIG. 1, the appliance 1 is shown. Polluted air, or at least air drawn from within the enclosed space is drawn into the unit under the influence of a fan, turbine or other air driving means (not shown) to move air through the apparatus.

Initially, the air is drawn through one or more particulate pre-filters such as the three stage filters 2, 3 and 4 being a coarse dust filter, fine dust filter and HEPA filter as shown. As is understood in the art, these are arranged in sequence such that the finer filter follows the coarser filter, etc. The purpose of these pre-filters is to remove as much particulate material as possible from the air stream. The subsequent apparatus seeks to work on the compounds that are constituents within the air stream and particulate material entering into the subsequent optional air compressor and molecular sieves is undesirable for performance.

Although this apparatus uses 3 stages of filtration, alternative numbers could be used provided some particulate pre-filtration is provided to keep such materials from the sieves.

The air may also be passed through an optional compressor 5 and, if the compressor is provided, cooling unit 6 to condition the temperature of the air. Similarly, the air may be heated or otherwise altered to a desired temperature range either before or after processing.

The air is then passed to the molecular sieves as shown in FIG. 1. The apparatus contains at least 3 sieves 7, 8 and 9, containing zeolite material. Typically for a small domestic appliance, intended for a space of up to 90 $m^2$, each of the sieves may contain between 0.5 and 1 kg of zeolite material. In the preferred form, approximately 2.2 kgs of material are evenly provided over the three sieves.

It should be noted that a minimum of 3 sieves are provided to operate in the manner as soon to be described. It will be obvious that a greater number may be used of varying volumes depending on the control of the operations.

The sieves 7, 8 and 9 are connected in parallel between an inlet 10 into which the air is first drawn and the outlet 20 through which cleaned air may be exhausted.

Each of the sieves is individually connected to the inlet through controlled valves 11, 12 and 13 and to the outlet through controlled valves 14, 15 and 16. Furthermore, each of the sieves is interconnected to each other through conduits 22. A regulator 17 is also provided in association with the conduits 22 so as to reduce pressure and bleed some of the air passing through the conduits to a sensing device and control circuit 18 as will be described later.

A control means 21 controls operations of the valves and regulator to achieve the desired processing sequence.

The operation of the control means 21 initially passes air into one of the sieves such as the first sieve 7. As air passes into the sieve, it will be appreciated that the air contained within the sieve is displaced. This air is simultaneously directed to the second sieve 8. In fact, free $O_2$ and free $N_2$ move through the zeolite media faster than other constituents hence the air within sieve 7 is mixed with some of the faster moving oxygen and free nitrogen into sieve 8. The air within sieve 8 is simultaneously displaced towards the outlet 20. Throughout this phase, the third sieve 9 is locked to retain the air within substantially immobile.

Following a designated retention time for the air to remain immobile in the third sieve 9, the valves and regulator are controlled to move the air once again. In this phase, valves 11 and 13 are closed and valve 12 opened such that incoming air is directed into the second sieve 8. The air within sieve 8 is directed towards the third sieve 9 which itself is connected to the outlet by the opening of valve 16. The first sieve is locked throughout this period to retain the air within.

In the third phase of the operation, incoming air is directed through valve 13 with both valves 11 and 12 closed, air is passed from sieve 9 into sieve 7 and sieve 8 is locked.

Hence it can be seen that a continuous cycle exists that includes a period of retention of the air and pollutants in the zeolite media.

To provide a domestic appliance or other installation, it is preferred to minimize any need to clean, replace or otherwise interrupt the operation of the molecular sieves. The integrity of the sieves is important and such maintenance would be beyond a normal home user or even in other installations, would require a service contract or similar for continued operation.

To ensure complete processing of the air through the sieves such that no residue builds up in the molecular sieves or exhausted as harmful pollutants after processing, the retention time for the air in each sieve is set to a minimum of 2 seconds and, to obtain a reasonable flow rate though the apparatus, a maximum of 10 seconds. More preferably the retention time is in the range of 3 to 5 seconds or even more preferably, between 3.5 and 4.5 seconds. An approximate time of 4 seconds may be used.

In providing such a retention, the zeolite media has the opportunity to act on relatively immobile compounds trapped within. A catalytic action may take place using the electron field and van der Vaals forces within the media to break the valence bonding in the pollutant compounds. By ensuring the retention time is sufficient, not only is oxygen released from more complex compounds and pollutants such as CO and $CO_2$ but each of the pollutants may be broken into simple components. During the subsequent phase in which the sieve is flushed from the top by air being displaced from another sieve, all the constituents, including carbon, may be released from the media. Carbon tends to be released in the form of carbon clusters such as $C_{66}$ which itself is a relatively harmless material and part of the natural environment, that will exhaust out of the apparatus and fall to the floor in the form of dust. It will eventually be removed upon vacuuming or otherwise cleaning the floor in the surrounding area or re-circulated through the apparatus and caught in the pre-filters.

The advantage of exhausting these carbon and other materials is that the sieve itself retains little or nothing from each usage.

Further, such processing exhausts Nitrogen which forms a natural part of air as the zeolite has broken the bonds of molecules such as NO and $NO_2$ by an adsorption process. The adsorption process is important in also ensuring there is no collection in the molecular sieves. The adsorption occurs when air from the inlet is first directed to a sieve. The zeolite material catches the Nitrogen compounds with the material and the bonds between the elements are broken during the retention period. When the valve at the outlet from the sieve is opened and air passing from the initial pass through an alternative sieve is passed into sieve, the smaller harmless compounds are exhausted. This is as opposed to traditional filters that absorb harmful materials in the existing form and retain these until the filter is cleaned or replaced.

Even upon extensive running for a period of twelve months in an experimental stage, a sieve was inspected and there was no noticeable build up of contaminants within the sieve. Furthermore, there was no noticeable drop in performance of the sieve.

Hence the apparatus controlled in this manner may continue to operate in a domestic or other setting without the need for any maintenance of the sieves for a considerable period of time, perhaps the design life of the apparatus itself.

Referring again to FIG. 1, the apparatus can also be seen to provide a sensing and control circuit. This circuit may be used to sense a characteristic such as pressure, perhaps downstream from the particulate filters. Unlike the sieves, the particulate pre-filters as in any similar filtering apparatus, do become clogged with particulate material over time and may require cleaning or replacement. However, as such pre-filters are easily washed in the case of the dust filters or replaced in the case of the HEPA filters, this is within the expectations of an appliance purchaser.

In this preferred embodiment, the sensing unit 18 seeks to sense pressure or similar to determine if the performance or flow through the filters has reduced sufficiently to indicate that maintenance of those filters is required. The sensing unit may be connected to a control circuit and indicating means (not shown) such that a light or similar is illuminated on the device. This may also be accompanied by shutting down of the apparatus either immediately, or only upon further degradation of performance to the point where too much particulate material may be getting through the filters and entering the sieves. This protects the sieves while also ensuring the users attention is brought to the need to attend to pre-filter maintenance.

In addition to sensing and control on pressure or flow rate, the sensing and control circuit can additionally or alternatively sense and control the apparatus in response to other parameters. For example, the machine temperature may be monitored to check for errors in functions or failure of items such as the cooling unit and compressor. Further, the quality of the air being passed from one sieve to another in the process through conduits 22 as bled off by the regulator 17 may be checked by sensing the % of oxygen and providing a warning if this falls below a threshold of, for example, 80% or more. Preferably the threshold for such a warning is set at about 82%. Further, if the oxygen percentage continues to fall below a lower threshold, the control circuit may stop operation of the apparatus 1. Such a lower threshold may be between 70 and 80% and preferably, about 72%.

An optional sound absorber 19 may be included on the exhaust to reduce noise emissions from the apparatus.

Hence it can be seen that the apparatus may provide improved indoor air quality while minimizing the need for maintenance to only the particulate filters. Sensing and indicating means and controls may be included on those filters to ensure they are maintained as well.

The method and apparatus provide a control over indoor air quality that, as a minimum, remove or reduce to acceptable levels for human occupation, the nine pollutants described by the World Health Organisation and regarded worldwide, as the main problems associated with indoor air quality. These pollutants are suspended particles, carbon dioxide, carbon monoxide, nitrogen dioxide, bacteria, formaldehyde, total volatile organic compounds, radon and ozone.

This invention has generally been described with reference to preferred embodiments that should not be considered limiting to the scope of the invention. Specific integers referred to throughout the description are deemed to incorporate known equivalents where appropriate.

The invention claimed is:

1. A method of improving air quality within an enclosed space, said method comprising the steps of:
   (a) drawing air from within said enclosed space;
   (b) passing said drawn air through at least one filter to remove at least some particulates;
   (c) directing filtered air to three molecular sieves in the following manner providing a substantially continuous operation including an air immobile retention period for each molecular sieve, each of said three molecular sieves having a first end and a second end and containing zeolite material therein, said second ends of said three molecular sieves being interconnected to each other by conduits:
      (i) directing filtered air to a first one of the three molecular sieves through the first end of said first molecular sieve while displacing and/or directing an amount of air previously within said first molecular sieve through said conduits to a second one of the three molecular sieves and displacing and/or directing air previously retained within said second molecular sieve through the first end of said second molecular sieve to an outlet, and simultaneously retaining air substantially immobile within a third one of the three molecular sieves for an air immobile retention period;

(ii) subsequent to said air immobile retention period for said third molecular sieve, directing filtered air to said second molecular sieve through the first end of said second molecular sieve while displacing and/or directing said amount of air previously within said second molecular sieve through said conduits to said third molecular sieve and displacing and/or directing air previously retained within said third molecular sieve through the first end of said third molecular sieve to said outlet, and simultaneously retaining air substantially immobile within said first molecular sieve for an air immobile retention period;

(iii) subsequent to said air immobile retention period for said first molecular sieve, directing filtered air to said third molecular sieve through the first end of said third molecular sieve while displacing and/or directing said amount of air previously within said third molecular sieve through said conduits to said first molecular sieve and displacing and/or directing air previously retained within said first molecular sieve through the first end of said first molecular sieve to said outlet, and simultaneously retaining air substantially immobile within said second molecular sieve for an air immobile retention period;

(iv) subsequent to said air immobile retention period for said second molecular sieve, operating the steps (i), (ii) and (iii) in a continuous cycle;

(d) whereby the oxygen content of air through said conduits is above a threshold, and after retaining the air substantially immobile within any one of the molecular sieves, the air retained within said any one molecular sieve is treated and pollutants in the air are broken into simple components, and when the treated air is displaced and/or directed from said any one molecular sieve to the outlet, substantially all said simple components are exhausted along with the treated air from said any one molecular sieve exclusively through the first end of said any one molecular sieve to the outlet.

2. The method of improving the air quality within an enclosed space as claimed in claim 1, wherein said air immobile retention period of between 2 and 10 seconds.

3. The method of improving the air quality within an enclosed space as claimed in claim 1, wherein said air immobile retention period is between 3 and 5 seconds.

4. The method of improving the air quality within an enclosed space as claimed in claim 1, wherein said air immobile retention period is between 3.5 and 4.5 seconds.

5. The method of improving the air quality within an enclosed space as claimed in claim 1, wherein said air immobile retention period is not less than 2 seconds.

6. The method of improving the air quality within an enclosed space as claimed in claim 1, further comprising passing the filtered air through a compressor before directing the filtered air to the three molecular sieves.

7. The method of improving the air quality within an enclosed space as claimed in claim 1, wherein the three molecular sieves are operated under a pressure greater than atmospheric.

8. The method of improving the air quality within an enclosed space as claimed in claim 1, wherein the air between the at least one filter and the outlet is pressurized.

9. The method of improving the air quality within an enclosed space as claimed in claim 6, wherein:
(a) at step (c) (i) further sensing and controlling the oxygen content of air through said conduits above said threshold;
(b) at step (c) (ii) further sensing and controlling the oxygen content of air through said conduits above said threshold; and
(c) at step (c) (iii) further sensing and controlling the oxygen content of air through said conduits above said threshold.

10. The method of improving the air quality within an enclosed space as claimed in claim 9, wherein the threshold is between 70% and 80%.

11. The method of improving the air quality within an enclosed space as claimed in claim 9, wherein the threshold is 72%.

12. A method of improving the air quality within an enclosed space as claimed in claim 9, wherein the threshold is 82%.

13. An apparatus for improving the air quality within an enclosed space, said apparatus comprising:
(a) air driving means to draw air from within said enclosed space through an air inlet;
(b) at least one filter connected to said inlet to remove at least some particulates;
(c) three molecular sieves containing zeolite material connected in parallel to each other between said at least one filter and an outlet, each of said three molecular sieves having a first end and a second end, said second ends of said three molecular sieves being interconnected to each other by conduits;
(d) a plurality of valves to direct flow from said at least one filter to any one of said three molecular sieves, flow from any one of said three molecular sieves to said outlet and flow between said three molecular sieves through said conduits; and
(e) control means for controlling said plurality of valves such that filtered air from said at least one filter is directed to a first one of the three molecular sieves through the first end of said first molecular sieve, an amount of air previously within said first molecular sieve is displaced and/or directed through said conduits to a second one of the three molecular sieves, air previously retained within said second molecular sieve is displaced and/or directed through the first end of said second molecular sieve to said outlet and air within a third one of the three molecular sieves is simultaneously retained substantially immobile for an air immobile retention period, and subsequently controlling said valves such that each molecular sieve progresses in a continuous cycle through the stages of receiving filtered air through the first end thereof from said at least one filter, retaining said air substantially immobile therein for an air immobile retention period and then receiving said amount of air through said conduits from another molecular sieve while being connected to said outlet, whereby the oxygen content of air through said conduits is above a threshold, and after retaining the air substantially immobile within any one of the molecular sieves, the air retained within said any one molecular sieve is treated and pollutants in the air are broken into simple components, and when the air is displaced and/or directed from said any one molecular sieve to the outlet, substantially all said simple components are exhausted along with the treated air from said any one molecular sieve exclusively through the first end of said any one molecular sieve to the outlet such that said apparatus provides a substantially continuous operation including an air immobile retention period for each molecular sieve.

14. The apparatus for improving the air quality within an enclosed space as claimed in claim 13, wherein said control means ensures said immobile retention period is between 2 and 10 seconds.

15. The apparatus for improving the air quality within an enclosed space as claimed in claim 13, wherein said control means ensures said immobile retention period is between 3 and 5 seconds.

16. The apparatus for improving the air quality within an enclosed space as claimed in claim 13, wherein said control means ensures said immobile retention period is between 3.5 and 4.5 seconds.

17. The apparatus for improving the air quality within an enclosed space as claimed in claim 13, further comprising a free standing unit.

18. The apparatus for improving the air quality within an enclosed space as claimed in claim 13, further comprising an alternative air moving or conditioning apparatus.

19. The apparatus for improving the air quality within an enclosed space as claimed in claim 13, wherein said three molecular sieves are operated under a pressure greater than atmospheric.

20. The apparatus for improving the air quality within an enclosed space as claimed in claim 13, further comprising a sensing means to sense performance of said at least one filter and an indicating means to alert a user to degradation of the performance beyond a pre-determined limit.

21. The apparatus for improving the air quality within an enclosed space as claimed in claim 13, wherein said control means ensures said air immobile retention period is not less than 2 seconds.

22. The apparatus for improving the air quality within an enclosed space as claimed in claim 13, further comprising a compressor connected between said at least one filter and said three molecular sieves.

23. The apparatus for improving the air quality within an enclosed space as claimed in claim 13, wherein said control means ensures the air between said at least one filter and said outlet is pressurized.

24. The apparatus for improving the air quality within an enclosed space as claimed in claim 13, wherein said control means includes a sensing unit for sensing and controlling the oxygen content of air through said conduits above a threshold.

25. The apparatus for improving the air quality within an enclosed space as claimed in claim 24, wherein the threshold is between 70% and 80%.

26. The apparatus for improving the air quality within an enclosed space as claimed in claim 24, wherein the threshold is 72%.

27. The apparatus for improving the air quality within an enclosed space as claimed in claim 24, wherein the threshold is 82%.

* * * * *

UNITED STATES PATENT AND TRADEMARK OFFICE
CERTIFICATE OF CORRECTION

PATENT NO. : 7,645,323 B2 Page 1 of 1
APPLICATION NO. : 11/204389
DATED : January 12, 2010
INVENTOR(S) : Massenbauer-Strafe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Sixteenth Day of November, 2010

David J. Kappos
*Director of the United States Patent and Trademark Office*